(12) United States Patent
Cui

(10) Patent No.: US 9,888,164 B1
(45) Date of Patent: Feb. 6, 2018

(54) DIGITAL CAMERA FOCUS SELF-CALIBRATION

(71) Applicant: Microsoft Technology Licensing, LLC, Redmond, WA (US)

(72) Inventor: Chengwu Cui, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/230,168

(22) Filed: Aug. 5, 2016

(51) Int. Cl.
| H04N 5/232 | (2006.01) |
| G02B 7/04 | (2006.01) |
| G03B 43/00 | (2006.01) |
| H04N 5/225 | (2006.01) |
| G03B 7/28 | (2006.01) |
| G03B 13/36 | (2006.01) |
| G02B 7/28 | (2006.01) |

(52) U.S. Cl.
CPC .......... *H04N 5/23212* (2013.01); *G02B 7/04* (2013.01); *G02B 7/28* (2013.01); *G03B 13/36* (2013.01); *G03B 43/00* (2013.01); *H04N 5/2253* (2013.01); *H04N 5/2254* (2013.01)

(58) Field of Classification Search
None
See application file for complete search history.

(56) References Cited

U.S. PATENT DOCUMENTS

| 7,936,144 B2 | 5/2011 | Vig et al. |
| 8,245,935 B2 | 8/2012 | Vinogradov |
| 8,577,216 B2 | 11/2013 | Li et al. |
| 8,736,747 B2 | 5/2014 | Li |
| 8,964,102 B2 | 2/2015 | Christo et al. |
| 2005/0031139 A1 | 2/2005 | Browning et al. |
| 2007/0047942 A1 | 3/2007 | Chang et al. |
| 2008/0297922 A1* | 12/2008 | Lule .................. G02B 7/08 359/824 |
| 2011/0063461 A1* | 3/2011 | Masuda ............. H04N 5/23203 348/208.11 |
| 2011/0234848 A1* | 9/2011 | Matsumoto ........ H04N 5/23254 348/231.4 |
| 2012/0257065 A1 | 10/2012 | Velarde et al. |
| 2014/0368724 A1 | 12/2014 | Zhang et al. |
| 2016/0014404 A1 | 1/2016 | Krestyannikov |

OTHER PUBLICATIONS

Simian, "Fine-tuning your camera's auto-focus accuracy," Published on Jun. 29, 2013, Available at <<http://www.georgesimian.com/behind-the-scenes/2013/6/29/fine-tuning-your-cameras-auto-focus-accuracy>>2 pages.
"International Search Report and Written Opinion Issued in PCT Application No. PCT/US2017/044269", dated Oct. 12, 2017, 10 Pages.

* cited by examiner

Primary Examiner — Roberto Velez
Assistant Examiner — Quan Pham
(74) Attorney, Agent, or Firm — Arent Fox LLP

(57) ABSTRACT

Focus self-calibration for a digital camera may be performed by moving a lens assembly of the digital camera over its travel range, and detecting travel limits of the lens assembly based on audio signal generated by the lens assembly reaching ends of the travel range. Digital-to-analog converter values corresponding to the lens assembly at the ends of the travel range may be used to create a camera focus profile.

20 Claims, 8 Drawing Sheets

US 9,888,164 B1

DIGITAL CAMERA FOCUS SELF-CALIBRATION

BACKGROUND

In addition to digital cameras, digital camera function is widely available as a built-in function for many portable electronic devices such as cellular phones, tablet computers, and laptop computers. These portable electronic devices are often taken with users and experience changing environment and conditions during their use. For instance, a user may take photographs using the digital camera function of a cellular phone over a wide range of temperatures and orientations. Many components, including lenses, are commonly made of plastic material and are susceptible to thermal expansion and contraction. Depending on the orientation of the portable electronic device, gravity may have a different effect on movable components, such as a lens assembly for focusing, and a different amount force may be needed to move the lens assembly depending on the orientation of the portable electronic device. For instance, if gravity is acting in a direction opposite of a direction of lens assembly movement, greater force may be required to move the lens assembly than if gravity is acting in a direction perpendicular to movement of the lens assembly. Typically, digital camera function, auto-focusing for example, may be calibrated at a factory with certain fixed conditions, such as holding the portable electronic device at a constant temperature with a specific orientation, then having the calibration profile saved in the portable electronic device. However, such a specific profile may not always correspond to actual use conditions.

BRIEF SUMMARY

This Summary is provided in order to introduce simplified concepts of the present disclosure, which are further described below in the Detailed Description. This summary is not intended to identify essential features of the claimed subject matter, nor is it intended for use in determining the scope of the claimed subject matter.

In some examples, one or more microphones of a portable electronic device may be used to assist in calibrating a lens assembly travel profile of a digital camera function. When the digital camera function is activated, a drive mechanism, such as a voice coil motor (VCM), of the portable electronic device moves a lens assembly until it reaches a first end of a travel range. The microphone(s) of the portable electronic device may detect a first audio signal produced by the lens assembly reaching the first end, and a first digital-to-analog converter (DAC) value corresponding to the position of the lens assembly at the first end may be recorded. The drive mechanism may then move the lens assembly in a reverse direction until it reaches a second end of the travel, located at the opposite end of the travel range. The microphone(s) may detect a second audio signal produced by the lens assembly reaching the second end, and a second DAC value corresponding to the position of the lens assembly at the second end may be recorded. In some examples, a current condition of the portable electronic device (e.g., ambient temperature and/or orientation of the portable electronic device) may be determined, and an appropriate lens assembly travel profile from a plurality of lens travel profiles stored in the portable electronic device may be accessed and/or revised based on the first and second DAC values.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

As discussed above, because a factory calibration is typically performed under specific controlled conditions, the factory calibration profile for auto-focusing may not adequately cover all temperature and orientation variations that a portable electronic device may experience during use. Disclosed are techniques to supplement the factory calibration profile by determining a range of a lens assembly travel under actual use conditions (e.g., when a camera function is requested). In some examples, a lens assembly in a housing is configured to be moved by a drive mechanism along a travel defined in the housing. In some examples, the drive mechanism may include a voice coil motor, a motor driven gear, a motor driven threaded sleeve, or other means to move the lens assembly in the housing relative to an image sensor. To calibrate a travel range of the lens assembly, drive signals, such as input digital values for a digital-to-analog converter (DAC), producing voltages corresponding to the lens assembly reaching the end of the travel, are determined. Microphones detect audio signals generated by the lens assembly reaching the end of its travel, and input values to the DAC corresponding to the audio signal detected are recorded. The DAC values are used to generate a new, or revise an existing, lens assembly travel profile in order to calibrate the auto-focus function of a digital camera.

The techniques described herein may be implemented in a number of ways. Several examples are provided below with reference to the following figures.

Figure 1:
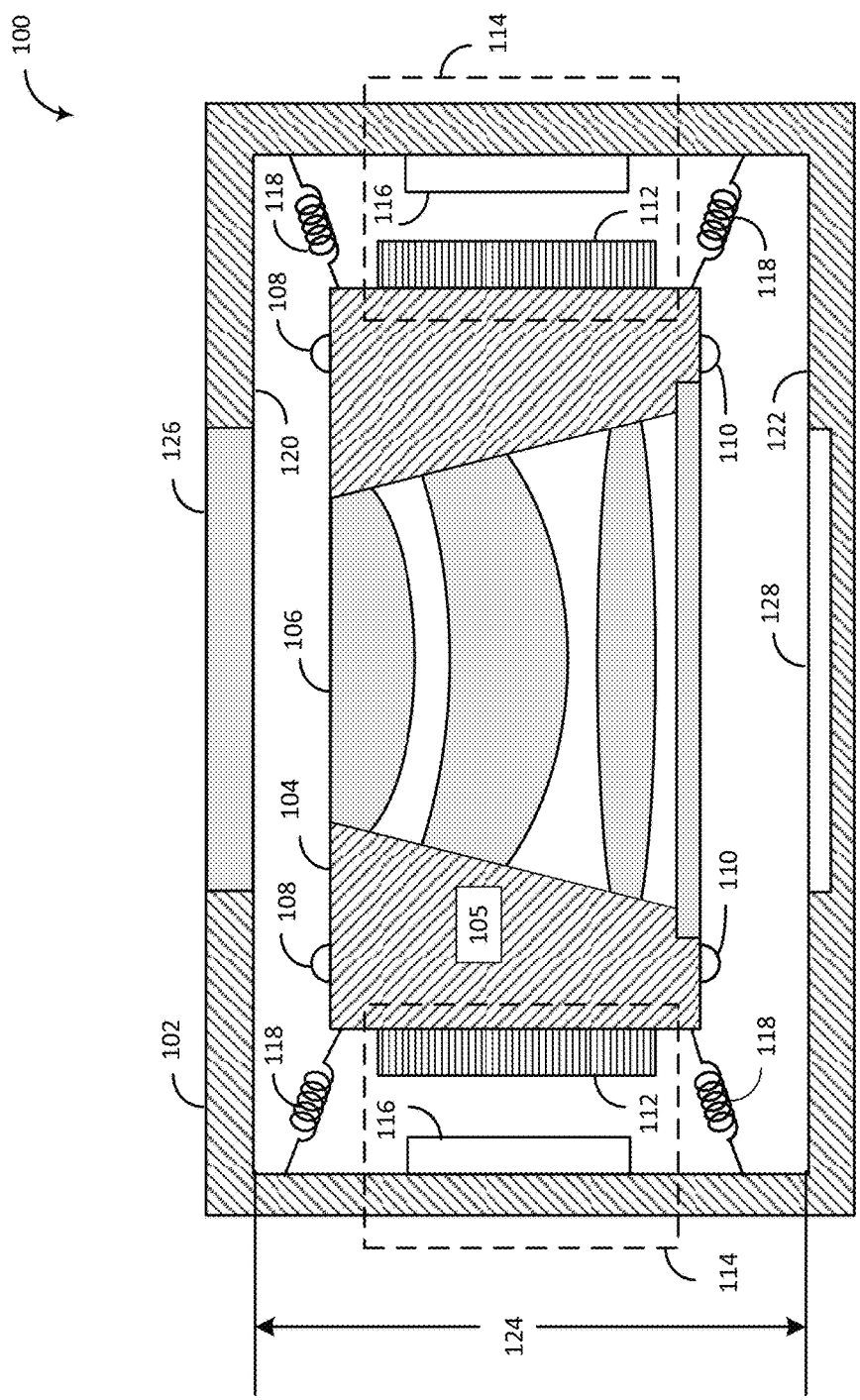
FIG. 1 is a schematic diagram of an example focus assembly of a camera focus device.

FIG. 1 is a schematic diagram of an example focus assembly 100 of a camera focus device. The focus assembly comprises a housing 102, which contains a lens assembly 104. The lens assembly 104 comprises a frame 105, one or more lenses 106, first contacts 108, second contacts 110, and a movable portion 112 of a drive mechanism 114. The first contacts 108 and second contacts 110 are shown as semi-spherical shapes, but the contacts may take on different shapes, sizes, and configurations. In some examples, the contacts may simply be portions of the frame 105 of the lens assembly 104 that contact the housing 102. A fixed portion 116 of the drive mechanism 114 is attached to the housing 102.

The drive mechanism 114 may be a voice coil motor (VCM) with an electromagnet, or a coil, as the movable portion 112 and a permanent magnet as the fixed portion 116, or vice versa. The drive mechanism 114 may be concentrically located relative to the lens assembly 104 (e.g., circumjacent to the lens assembly). The drive mechanism 114 is configured to move the lens assembly 104 towards the first end 120 until the first contacts 108 reach the first end 120, and to move the lens assembly 104 towards the second end 122 until the second contacts 110 reach the second end 122. In this example, the first end 120 and second end 122 are shown as the inner walls of the housing 102 which define a travel 124 of the lens assembly 104. The housing 102 further comprises a lens cover 126 and an image sensor 128.

The lens assembly 104 may be suspended in the housing 102 by a suspension mechanism 118, shown here as a set of springs, and may settle in a neutral position when the drive mechanism 114 is inactive. While illustrated as coil springs, the suspension mechanism 118, may additionally or alternatively comprise one or more leaf springs, cantilever springs, membranes, diaphragms, bands, straps, or other elements configured to suspend the lens assembly 104 relative to the housing 102, while allowing axial movement of the lens assembly 104 relative to the housing 102. In some examples, the suspension mechanism 118 may comprise a resilient or elastomeric material. In some examples, the suspension mechanism 118 may bias the lens assembly toward the neutral position. Additionally or alternatively, the suspension mechanism 118 may damp movement of the lens assembly 104 relative to the housing 102.

Figure 2:
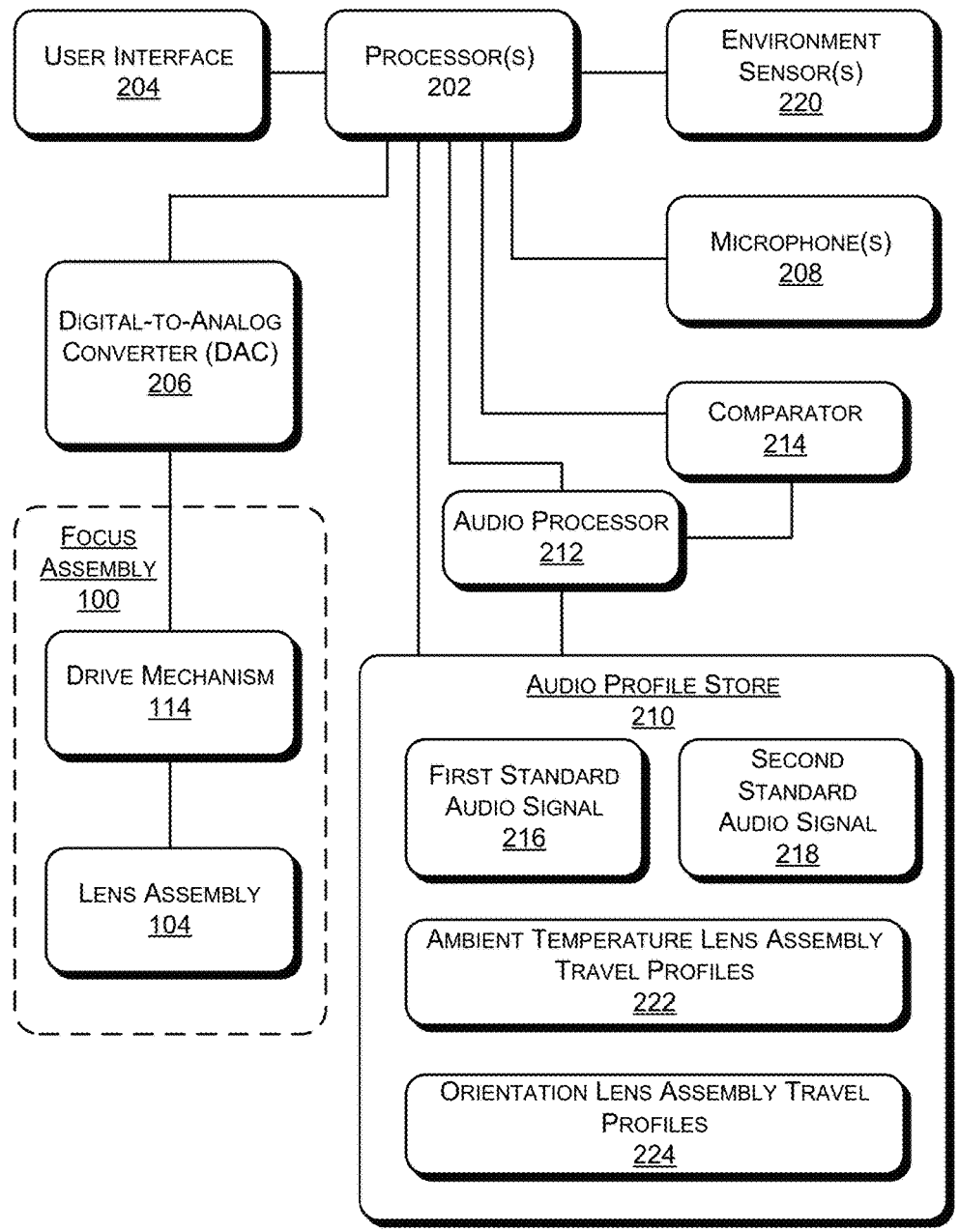
FIG. 2 is a block diagram of an example camera focus device including the focus assembly of FIG. 1.

FIG. 2 is a block diagram of a camera focus device 200 including the focus assembly 100 of FIG. 1. The camera focus device 200 may be a component of a portable electronic device such as a cellular phone, a tablet computer, a personal computer, and the like, and may comprise, in addition to the focus assembly 100, one or more processors 202, which may directly or indirectly communicate with other blocks and components of the camera focus device 200 and the portable electronic device. A user interface 204, which is coupled to the processors 202, may receive an input requesting a camera function of the portable electronic device to be activated, and the processors 202 may activate the camera function.

Once activated, the processors 202 may begin a self-calibration procedure by moving the lens assembly 104 towards the first end 120 by supplying an input value, a 16-bit word for example, to a digital-to-analog converter (DAC) 206. The DAC 206 converts the input value to a corresponding voltage and applies the voltage to the drive mechanism 114, which results in a movement of the lens assembly 104 to a position in the travel 124 corresponding to the input value. The processors 202 may vary the input value to the DAC 206 appropriately until the first contacts 108 reach the first end 120.

Figure 3:
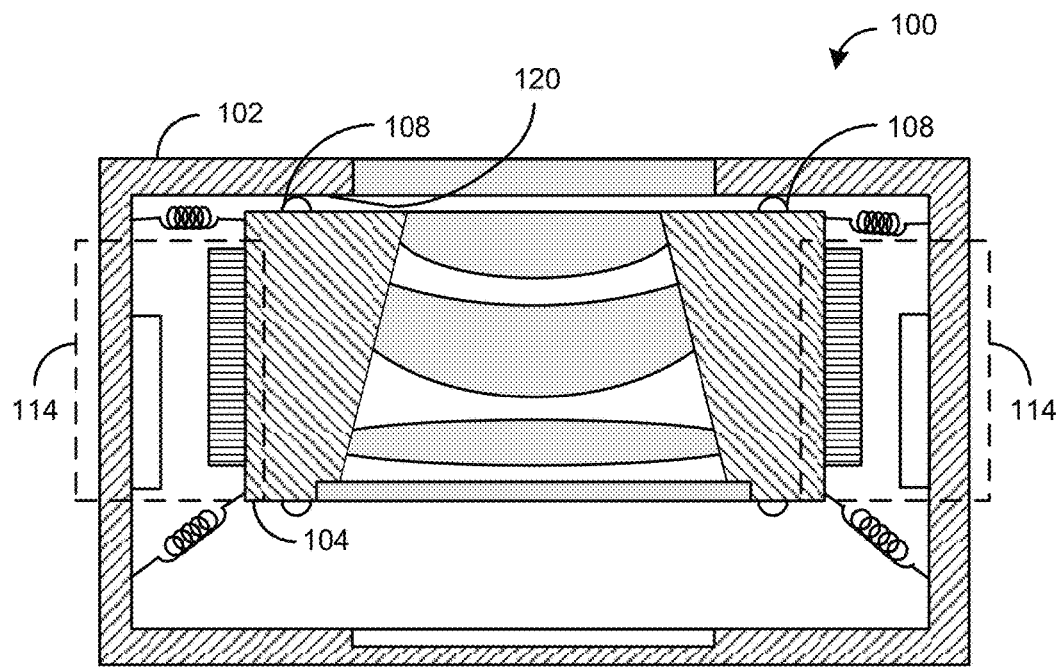
FIG. 3 is a schematic diagram of the example focus assembly of FIG. 1, where the lens assembly has been moved and reached a first end of travel.
Figure 4:
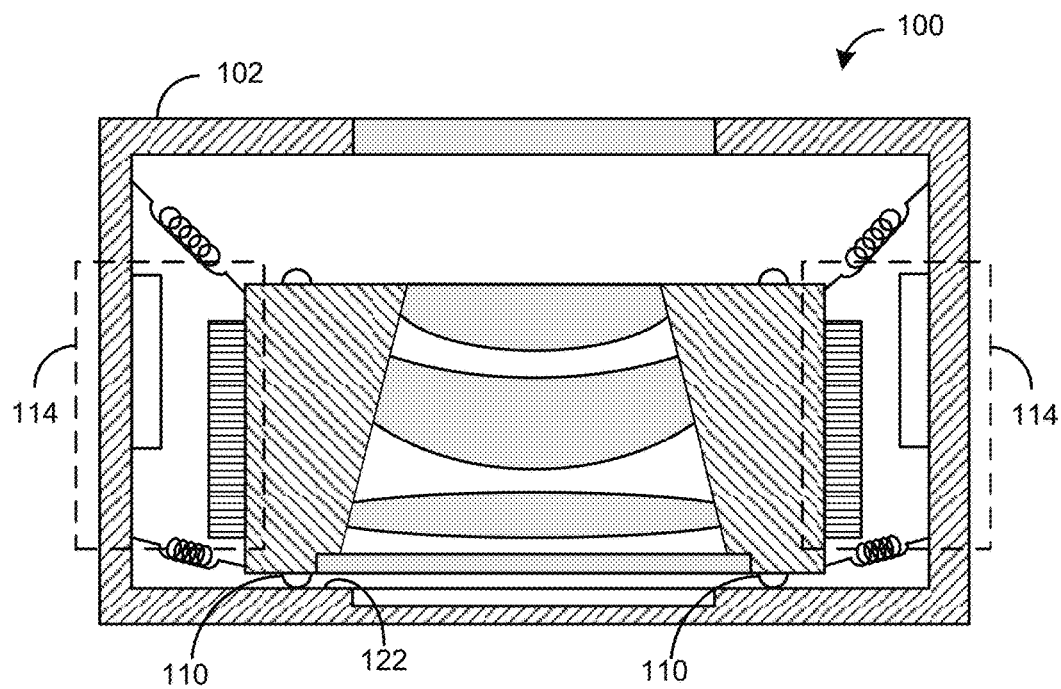
FIG. 4 is a schematic diagram of the example focus assembly of FIG. 1, where the lens assembly has been moved and reached a second end of travel.

FIG. 3 provides a schematic diagram of the focus assembly 100 where the lens assembly 104 has been moved and reached the first end 120. To determine what input value to the DAC 206 corresponds to the lens assembly 104 reaching the first end 120, the processors 202 may also activate one or more microphones 208 of the portable electronic device upon activating the camera function. As the processors 202 vary the input value to the DAC 206 moving the lens assembly 104 towards the first end 120, the microphones 208 monitor for a first end audio signal, resulting from the first contacts 108 contacting the first end 120. When the microphones 208 detect the first end audio signal, the input value to the DAC 206 at that time is recorded as a first value. Therefore, the first value corresponds to the position of the lens assembly 104 at the end of the travel 124 reaching the first end 120. The processors 202 may then move the lens assembly 104 in a reverse direction towards the second end 122 by appropriately varying the input value to the DAC 206. The microphones 208 monitor for, and detect, a second end audio signal, resulting from the second contacts 110 contacting the second end 122, and a second value, corresponding to the position of the lens assembly 104 at the other end of the travel 124 reaching the second end 122, is recorded. FIG. 4 provides a schematic diagram of the focus assembly 100 where the lens assembly 104 has been moved and reached the second end 122.

Based on the first and second values, a lens travel profile, which may be a calibrated profile stored during a previous or factory calibration process, in an audio profile store 210 may be revised. A position of the lens assembly 104, y, as a function of a DAC value, x, may be expressed as an equation (1) below, which may be used to calibrate the lens travel profile based on the first and second values.

$$y(x)=f(x, \text{nearStopper}, \text{farStopper}, \text{nearStopper0}, \text{farStopper0}, \text{macroPosition0}, \text{infinityPosition0}) \quad (1)$$

where
y=desired lens position,
x=DAC value,
nearStopper=the second value, the DAC value when the lens assembly 104 contacts the second end 122 during the self-calibration,
farStopper=the first value, the DAC value when lens assembly 104 contacts the first end during the self-calibration,
nearStopper0=the DAC value when lens assembly 104 contacts the second end 122 in the factory calibration process,
farStopper0=DAC value when lens assembly 104 contacts the first end 120 in the factory calibration process,
macroPosition0=a position of the lens assembly 104 in focus for macro in the factory calibration process,
infinityPosition0=a position of the lens assembly 104 in focus for infinity in the factory calibration process.

The audio profile store 210 is coupled to the processors 202 and to an audio processor 212 that is configured to process the first and second audio signals to reduce a false detection. The audio processor 212 may filter the first and second end audio signal to reduce noise and/or may apply Fast Fourier Transform to evaluate the frequency characteristics of the audio signals. To validate the detected audio signals, a comparator 214 may compare the processed first end audio signal to a first standard audio signal 216 and the processed second end audio signal to a second standard audio signal 218 stored in the audio profile store 210. In some examples, the first standard audio signal 216 may be a characteristic profile of a first end audio signal produced under a control environment in a factory by a standard camera focus device, which may be used as a standard model. The second standard audio signal 218 may be similarly produced by the standard camera focus device with regard to a second end audio signal. If the comparator 214 determines that the processed first end audio signal is within a predetermined tolerance of the first standard audio signal 216, the first value, which corresponds to the position of the lens assembly 114 at the first end 120, is validated. Similarly, the comparator 214 determines whether the second value, which corresponds to the position of the lens assembly 114 at the second end 122, is valid.

The camera focus device 200 may further comprise one or more environment sensors 220 to monitor the current environment, such as ambient temperature and orientation of the camera focus device 200. Once the first and second values are validated, the processors 202 may select an appropriate lens travel profile stored in the audio profile store 210 based on the ambient temperature and the orientation of the camera focus device 200 received from the environment sensors 220.

Figure 5:
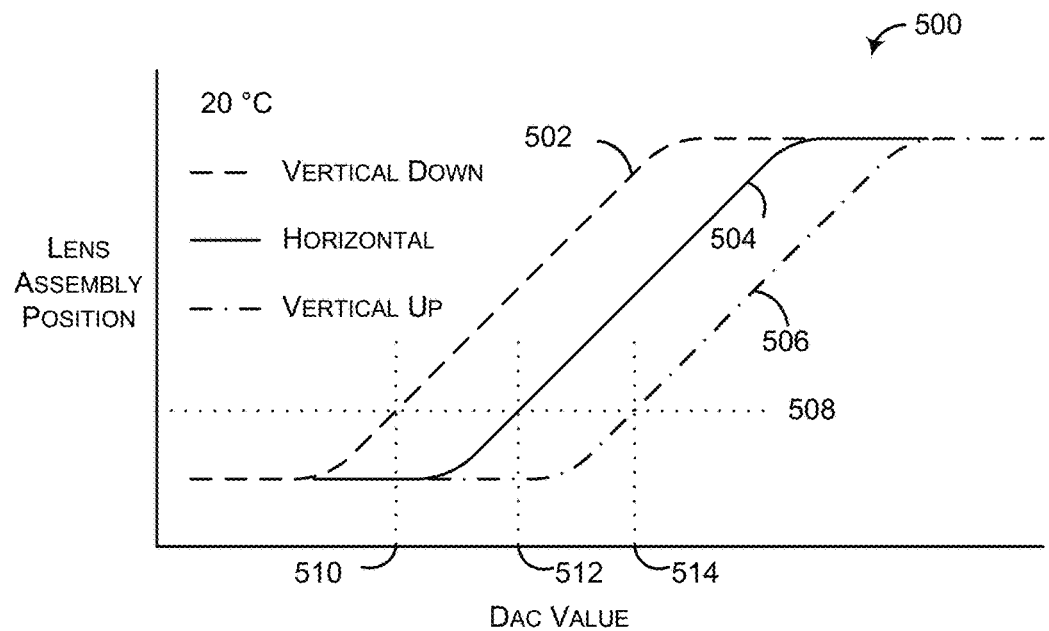
FIG. 5 is a graph of the lens assembly position obtained during an example calibration process as a function of digital-to-analog converter value with the camera focus device in various orientations at a constant ambient temperature.

The audio profile store 210 may further comprise a plurality of lens assembly travel profiles such as ambient temperature lens assembly travel profiles 222 and orientation lens assembly travel profiles 224. FIG. 5 shows an example set of orientation lens assembly travel profiles 500. The travel profiles 500 describe the position of the lens assembly 104 as a function of the input DAC value to the DAC module 206 taken during the calibration process with the camera focus device 200 in three positions at an ambient temperature (e.g., 20° C.); a vertical down position 502 (in which the portable electronic device is parallel to the ground with the camera focus device 200 facing down), a horizontal position 504 (in which the portable electronic device is orthogonal to the ground with the camera focus device 200 parallel to the ground), and a vertical up position 506 (in which the portable electronic device is parallel to the ground with the camera focus device 200 facing up). As shown in FIG. 5, for a lens assembly position 508, the corresponding input DAC value is different for each orientation. For example, the DAC values are shown at 510 for the vertical down position, 512 for the horizontal position, and 514 for the vertical up position. While lens travel profiles are illustrated in FIG. 5 for three different orientations of the lens assembly, in other examples, lens travel profiles may be stored for any number of more or less orientations (e.g., 15 degrees down, 30 degrees down, 45 degrees down, 60 degrees down, 75 degrees down, 15 degrees up, 30 degrees up, 45 degrees up, 60 degrees up, 75 degrees up, etc.).

Figure 6:
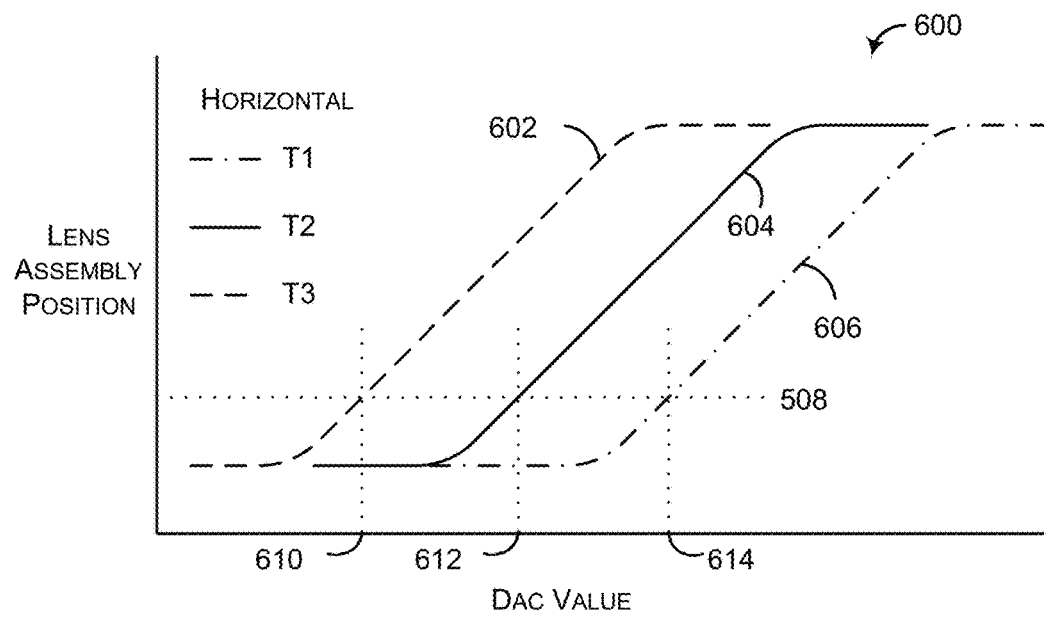
FIG. 6 is a graph of the lens assembly position obtained during an example calibration process as a function of digital-to-analog converter value with the camera focus device in a fixed orientation at various ambient temperature points.

FIG. 6 shows an example set of ambient temperature lens assembly travel profiles 600. The profiles 600 describe the position of the lens assembly 104 as a function of the input DAC value to the DAC module 206 taken during the calibration process with the camera focus device 200 in a horizontal position at three different ambient temperature points, T1, T2, and T3. For example, line 602 for T1 may be at 0° C., line 604 for T2 at 20° C., and line 606 for T3 at 60° C. In FIG. 6, as similarly shown in FIG. 5, for the lens assembly position 508, the corresponding DAC value is again different for each temperature, 610 at 0° C., 612 at 20° C., and 614 at 60° C. While lens travel profiles are illustrated in FIG. 6 for three different temperatures, in other examples, lens travel profiles may be stored for any greater or lesser numbers temperatures and/or any temperatures higher or lower than those listed (e.g., −20° C., −10° C., 10° C., 30° C., etc.)

In some examples, lens assembly travel profiles may be stored for unique set of environmental combinations (e.g., for each pair of orientation and temperature). Based on environment information from the environment sensors 220, an appropriate lens assembly travel profile may be selected for revision. For example, if the environment sensors 220 indicate that the ambient temperature is 30° C. and the orientation of the camera focus device 200 is horizontal, the processors 202 may consider the lens assembly travel profile 504 as the best matched profile and revise it based on the first and second values. The revised profile may be saved in the audio profile store 210 as a new profile or may be only used temporarily.

Figure 7:
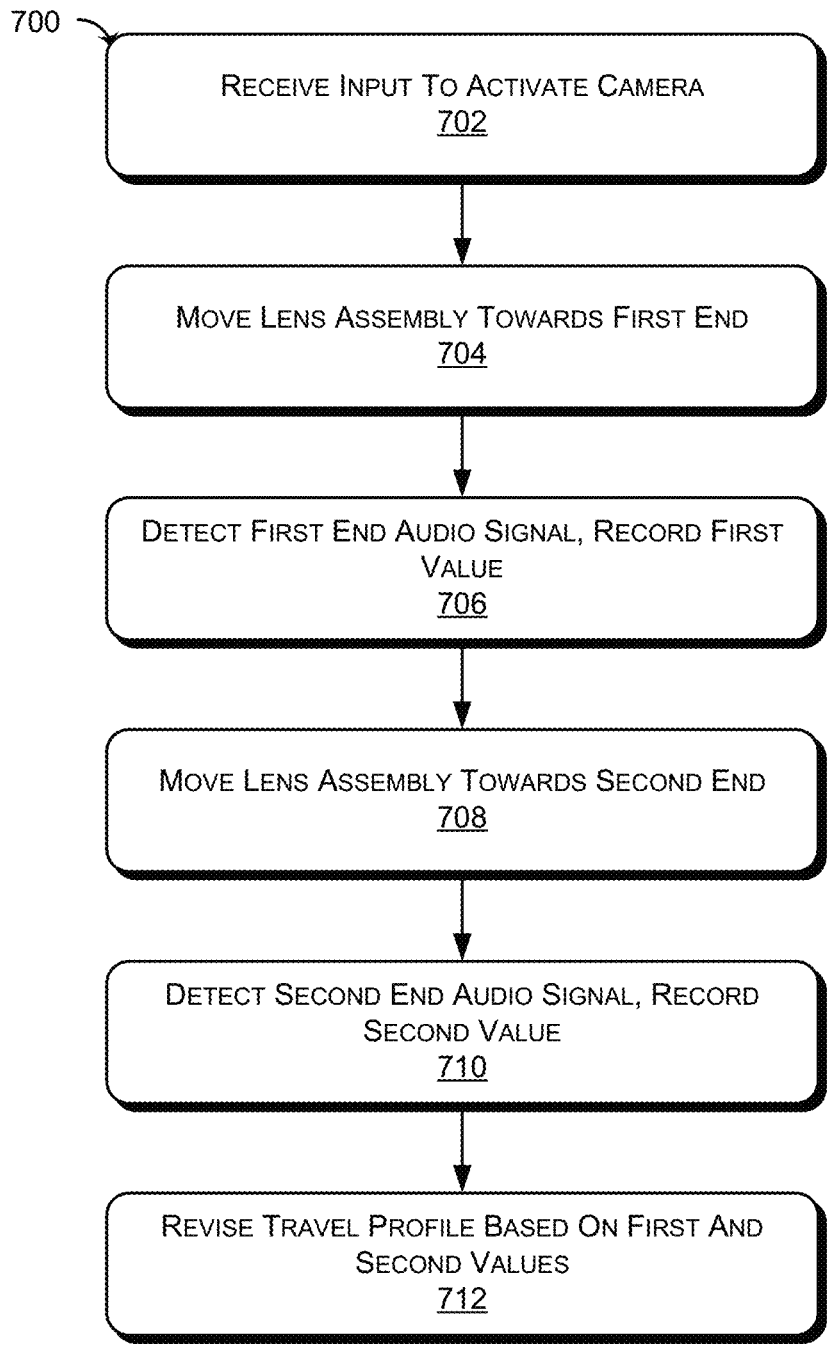
FIG. 7 is a flow chart of an example process of a focus self-calibration.

FIG. 7 is an example flow chart illustrating a process 700 of a focus self-calibration. The process 700 may, but need not necessarily, be implemented using the focus assembly 100 and/or camera focus device 200. However, in other examples, the process 700 may be implemented using other hardware and/or software devices and systems. For ease of illustration, the process 700 will be described with reference to the focus assembly 100 and the camera focus device 200, but process 700 is not limited to performance with these devices. Also, the focus assembly 100 and camera focus device 200 may be used to perform other processes and are not limited to performing the process 700.

At block 702, a portable electronic device equipped with the camera device 200 may receive a request to activate the camera function as described above with reference to the user interface 204. Upon activation of the camera function, the portable electronic device may start a focus self-calibration process. To determine input DAC values corresponding to the travel range of the focus assembly 104, the portable electronic device moves the lens assembly 104 towards the first end 120 in block 704. The lens assembly 104 is moved by the drive mechanism 114, such as a voice coil motor receiving a voltage from the DAC 206, which receives the input DAC value from the processors 202 as described above with reference to the drive mechanism 114.

When the first end audio signal, which is an audio signal generated by the lens assembly 104 contacting the first end 120, is detected in block 706, the input DAC value at that time is recorded as the first value as described with reference to the microphones 208. Then in block 708, the lens assembly 104 is moved in a reverse direction by varying the input DAC value accordingly until the microphones 208, in block 710, detect the second end audio signal, which is an audio signal generated by the lens assembly 104 contacting the second end 122, and the DAC value at that time is recorded as the second value. In block 712, a lens assembly travel profile is generated based on the first and second values. The generated lens assembly travel profile may be saved as a new profile, or may be used to revise, update, or replace an existing profile.

Figure 8:
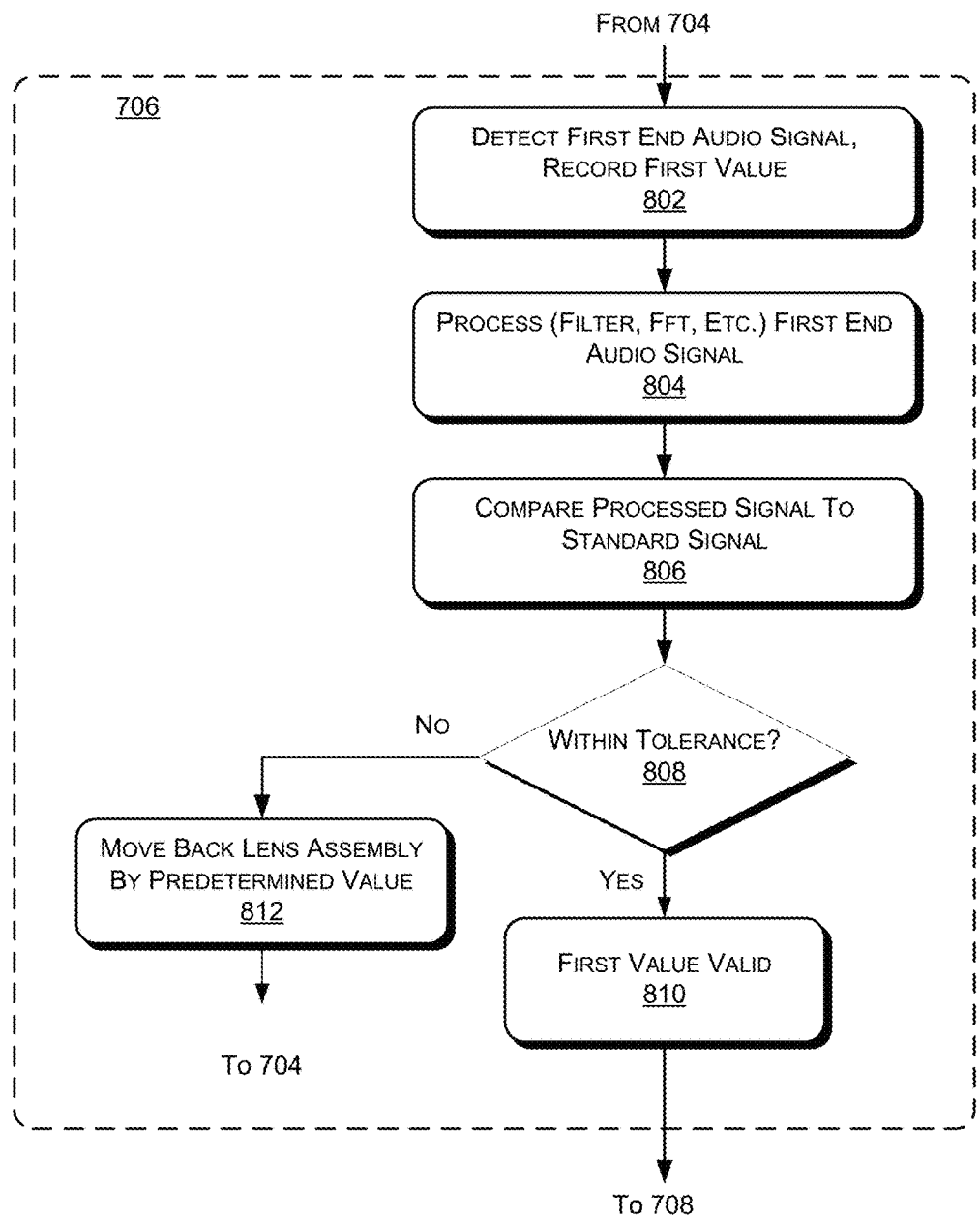
FIG. 8 is a flow chart detailing additional examples of one of the blocks of FIG. 7.
Figure 9:
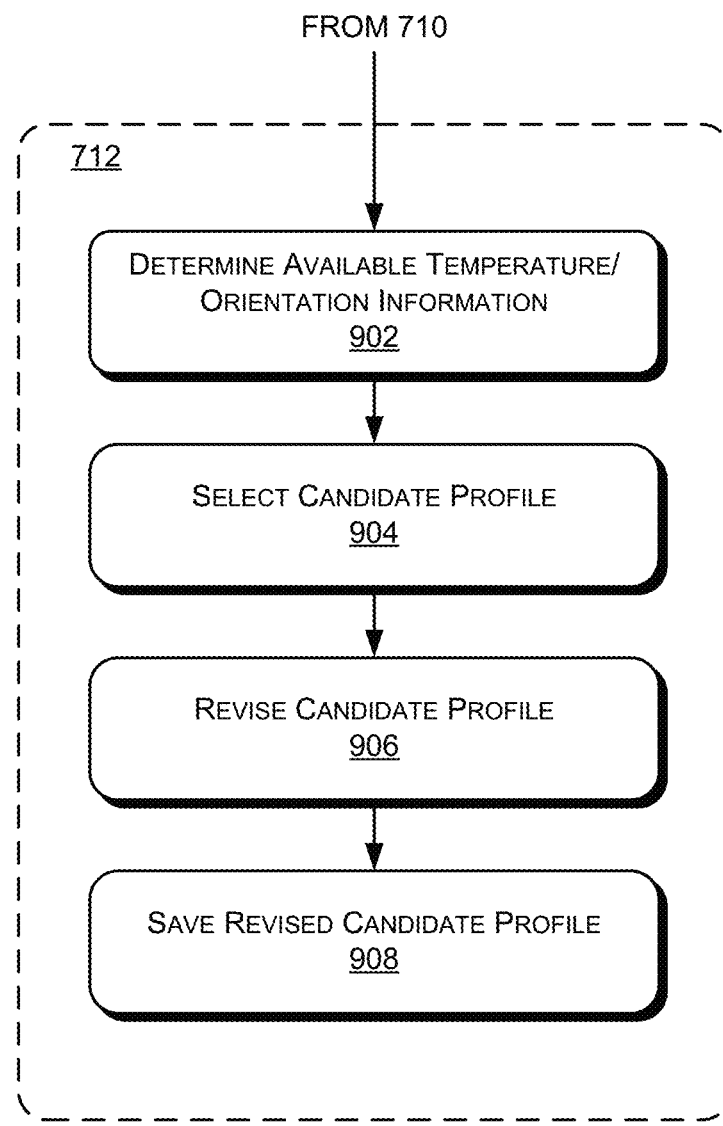
FIG. 9 is a flow chart detailing additional examples of one of the blocks of FIG. 7.

FIG. 8 is an example flow chart detailing block 706. In block 802, the first end audio signal may be detected and the corresponding first value may be recorded. To reduce false detection, the detected first audio signal is processed in block 804. The processing of the audio signal may involve filtering the detected audio signal to reduce the noise, and/or applying Fast Fourier Transform to extract its frequency characteristics. In block 806, the processed audio signal is compared to the first standard audio signal 216 as described above in reference to the audio processor 212. If the processed first end audio signal is determined, in block 808, to be within a predetermined tolerance of the first standard audio signal 216, then the recorded first value is validated as the DAC value when the lens assembly 114 reached the first end 120 in block 810, and the process proceeds to block 708. However, in block 808, if the detected and processed first end audio signal is determined to be outside of the predetermined tolerance, then the lens assembly 104 may be moved back by a predetermined value in block 812, and the process may be sent back to block 704. A similar process may be performed regarding block 710 for detecting the second end audio signal and recoding the second value, and the validated first and second values are used in block 712 for revising a lens assembly travel profile. FIG. 9 is an example flow chart detailing block 712 for revising a lens assembly travel profile. In block 902, available environmental information, such as ambient temperature and/or orientation of the camera focus device 200, may be ascertained as described above with reference to the environment sensors 220. Based on the available information, a candidate profile that best matches the environmental conditions may be selected from a plurality of lens assembly travel profiles in block 904 as described above with reference to the ambient temperature lens assembly travel profiles 222 and the orientation lens assembly travel profiles 224. In some examples, the candidate lens travel profile that best matches the environmental conditions may be selected based first on orientation and then based on temperature. For instance, the candidate lens profile may be selected by first identifying a set of lens travel profiles corresponding to an orientation closest to the current orientation of the lens assembly (as indicated by the measured environmental information). Then, a lens travel profile corresponding to a temperature closest to the current temperature of the lens assembly (as indicated by the measured environmental information) may be selected from among the set of lens travel profiles. In the example of FIGS. 5 and 6, lens travel profiles exist for three different orientations and three different temperatures. Now assume the measured environmental information indicates that the lens assembly is currently oriented at −4 degrees, and the ambient temperature is 18° C. The lens travel profiles corresponding orientation closest to −4 degrees are the set of profiles corresponding to a horizontal orientation (as shown in FIG. 6). From among the set of lens travel profiles corresponding to the horizontal orientation, the lens travel profile closest to 18° C. is the lens travel profile 604 corresponding to 20° C. In other examples, the candidate lens travel profile may be selected using other techniques, such as based first on temperature and then on orientation, based on a least squares regression, or other techniques. The selected candidate profile may then be revised in block 906 based on the validated first and second values, and be saved in block 908.

Figure 10:
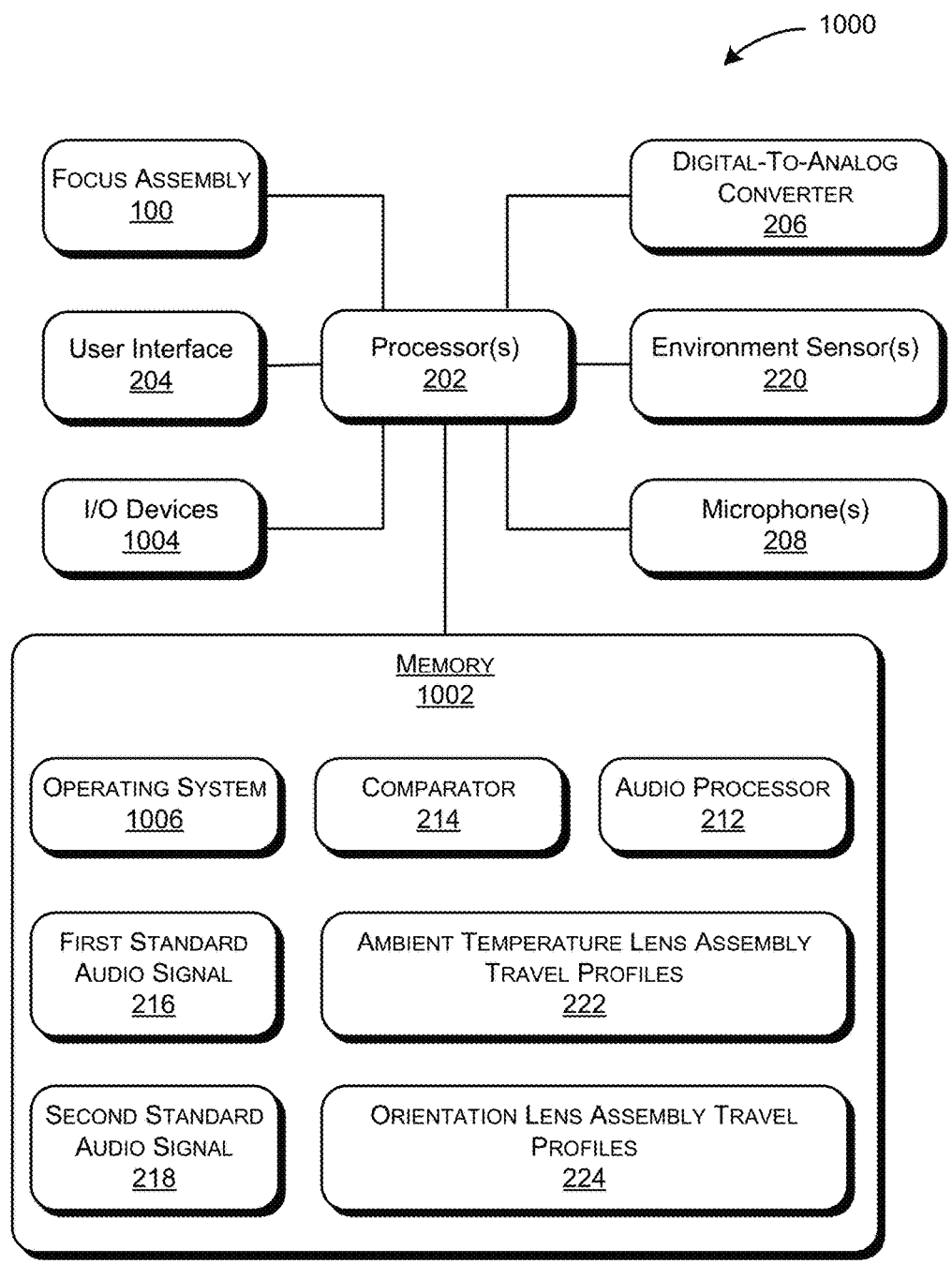
FIG. 10 is a block diagram of an example system usable to perform techniques described herein.

FIG. 10 is a block diagram of an example camera focus self-calibration system 1000 usable to perform methods described above. The system 1000 may be embodied as or included in, for example, a personal computer (PC), laptop computer, tablet computer, cellular phone, or any computing other device equipped with digital camera functionality. The system 1000 comprises one or more processors 202, a focus assembly 100 and memory 1002 both coupled to the processor(s) 202. The system 1000 may also include a user interface 204, a digital-to-analog converter (DAC) 206, one or more microphones 208, one or more environment sensors 220, and one or more input/output (I/O) devices 1004, such as a keyboard, mouse, pen, voice input device, touch screen, and speakers, and the like, all of which are coupled to the processor(s) 202.

The memory 1002 may store program instructions that are loadable on and executable by the processor(s) 202, as well as data generated during execution of, and/or usable in conjunction with, these programs. In the illustrated example, memory 1002 stores an operating system 1006, which provides basic system functionality of the system 1000 and, among other things, provides for operation of the other programs and modules of the system 1000.

In some examples, the memory 1002 may include various aspects of focus self-calibrating such as the audio processor 212, the comparator 214, the first standard audio signal 216, the second standard audio signal 218, ambient temperature lens assembly profiles 222, and the orientation lens assembly profiles 224 as described above. Some of these aspects may be implemented as software modules, as hardware components, or combinations of software and hardware.

Depending on the configuration and type of computing device used, memory 1002 of the system 1000 in FIG. 10 may include volatile memory (such as random access memory (RAM)) and/or non-volatile memory (such as read-only memory (ROM), flash memory, etc.). Memory 1002 may also include additional removable storage and/or non-removable storage including, but not limited to, flash memory, magnetic storage, optical storage, and/or tape storage that may provide non-volatile storage of computer-readable instructions, data structures, program modules, and other data for computing system 1000.

Memory 1002 is an example of computer-readable media. Computer-readable media includes at least two types of computer-readable media, namely computer storage media and communications media. Computer storage media includes volatile and non-volatile, removable and non-removable media implemented in any process or technology for storage of information such as computer-readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media embodies computer-readable instructions, data structures, program modules, or other data in a modulated data signal, such as a carrier wave, or other transmission mechanism. As defined herein, computer storage media does not include communication media.

EXAMPLE CLAUSES

A. A method of focus calibration in a portable electronic device, the method comprising: receiving an input to activate a camera function of the portable electronic device; moving, by a drive mechanism, a lens assembly of the portable electronic device towards an end of a lens assembly travel; detecting an audio signal associated with the lens assembly reaching the end and recording an end value; and generating a lens assembly travel profile based at least in part on the end value, the lens assembly travel profile indicative of a lens assembly position for focusing.

B. A method as paragraph A recites, further comprising: activating, upon receiving the input to activate the camera function, one or more microphones of the portable electronic device to detect the audio signal.

C. A method as paragraph A or B recites, wherein, the value corresponds to an input value to the drive mechanism when the one or more microphones detect the audio signal.

D. A method as paragraph C recites, wherein the value is a digital-to-analog converter (DAC) value supplied to the drive mechanism when the one or more microphones detect the audio signal.

E. A method as any of paragraphs A-D recite, wherein the end of the lens assembly travel comprises a first end of lens assembly travel, the audio signal associated with the lens assembly reaching the first end of lens assembly travel comprises a first audio signal, and the end value recorded when the lens assembly reaching the first end of lens assembly travel comprises a first end value, the method further comprising: moving, by the drive mechanism, the lens assembly towards a second end of the lens assembly travel; detecting a second end audio signal associated with the lens assembly reaching a second end and recording a second value; and wherein the generating the lens assembly travel profile is further based at least in part on the second end value.

F. A method as any of paragraphs A-E recite, wherein the detecting the audio signal comprises: processing the audio signal to obtain a processed audio signal; comparing the processed audio signal to a standard audio signal profile stored in the portable electronic device; and validating the value if the audio signal matches the standard audio signal profile within a threshold tolerance.

G. A method as any of paragraphs A-F recite, wherein the generating the lens assembly travel profile comprises: selecting a candidate profile from a plurality of lens assembly travel profiles stored in the portable electronic device based upon at least one of: ambient temperature, or orientation of the portable electronic device; and revising the candidate profile based upon the value.

H. A method as paragraph G recites, wherein the plurality of lens assembly travel profiles comprises: a set of ambient temperature lens assembly travel profiles based on a fixed orientation at a plurality of ambient temperature points, and a set of orientation lens assembly travel profiles based on a fixed ambient temperature at a plurality of orientations.

I. A camera focus device comprising: a housing; one or more processors; a lens assembly disposed in the housing, the lens assembly configured to move along a travel relative to the housing, the travel having a first end and second end opposite the first end; a drive mechanism communicatively coupled to the lens assembly and to the one or more processors, the drive mechanism configured to move the lens assembly along the travel based on a drive input signal; one or more microphones communicatively coupled to the one or more processors, the one or more microphones configured to detect an audio signal produced by the lens assembly reaching an end of the travel; and an audio profile store communicatively coupled to the one or more processors, the audio profile store configured to: record a value corresponding to the drive input signal when the one or more microphones detects the audio signal, and generate, based at least in part on the value, a lens assembly travel profile indicative of a lens assembly position for focusing.

J. A camera focus device as paragraph I recites, further comprising a comparator communicatively coupled to the one or more processors and to the audio profile store, the comparator configured to: compare the audio signal to a standard audio signal profile stored in the audio profile store, and validate the value if the audio signal is within a threshold tolerance of the standard audio signal profile.

K. A camera focus device as any of paragraphs I or J recites, further comprising an audio processor communicatively coupled to the one or more processors, to the audio profile store, and to the comparator, the audio processor configured to: process the audio signal by at least one of: filtering to reduce noise on the audio signal, or applying Fast Fourier Transform to extract frequency components of the audio signal.

L. A camera focus device as any of paragraphs I-K recite, further comprising: a digital-to-analog converter (DAC) communicatively coupled to the one or more processors and to the drive mechanism, the DAC configured to receive the value from the one or more processors and to provide a corresponding voltage as the drive input signal to the drive mechanism.

M. A camera focus device as any of paragraph I-L recite, further comprising: one or more environment sensors coupled to the one or more processors, the one or more environment sensors configured to detect at least one of: ambient temperature, or orientation of the camera focus device.

N. A camera focus device as paragraph M recites, wherein the profile module is further configured to: store a plurality of lens assembly travel profiles comprising: a set of ambient temperature lens assembly travel profiles based on a fixed orientation at a plurality of ambient temperature points, and a set of orientation lens assembly travel profiles based on a fixed ambient temperature at a plurality of orientations; select a candidate profile form the plurality of lens assembly travel profiles based on at least one of ambient temperature or orientation of the camera focus device, and revise the candidate profile based upon the first and second values.

O. A camera focus device as any of paragraphs I-N recite, wherein the drive mechanism comprises a voice coil motor positioned concentrically relative to the lens assembly.

P. A camera focus device as any of paragraphs I-O recite, further comprising: a suspension mechanism attached to the lens assembly and housing, the suspension mechanism configured to suspend the lens assembly in a neutral position relative to the housing when the drive mechanism is inactive, and to provide a resistance against a movement of the lens assembly.

Q. A system comprising: one or more processors; a focus assembly communicatively coupled to the one or more processors; one or more microphones communicatively coupled to the one or more processors; and memory communicatively coupled to the one or more processors, the memory storing instructions that, when executed by the one or more processors, cause the system to: receive an input to activate a camera function of the system; move a lens assembly towards an end of the lens assembly travel; detect, by the one or more microphones, an audio signal associated with the lens assembly reaching the end of the lens assembly travel and recording a value; and generate a lens assembly travel profile based at least in part on the value, the lens assembly travel profile indicative of the lens assembly position for focusing.

R. A system as paragraph Q recites, wherein the instructions, when executed by the one or more processors, further cause the system to: process the audio signal; compare the audio signal to a standard audio signal profile stored in the memory; and validate the value if the processed audio signal matches the standard audio signal profile within a threshold tolerance.

S. A system of as paragraph Q or R recites, wherein the instructions, when executed by the one or more processors, further cause the system to: select a candidate profile from a plurality of lens assembly travel profiles stored in the computing device based upon at least one of: ambient temperature, or orientation of the focus assembly; and revise the candidate profile based upon the first and second values.

T. A system as any of paragraphs Q-S recite, wherein the instructions, when executed by the one or more processors, further cause the system to: save the revised candidate profile as a new lens assembly travel profile.

As used herein, the term "techniques" can refer to system(s), method(s), computer-readable media encoded with instructions, module(s), and/or algorithms, as well as hardware logic (e.g., Field-programmable Gate Arrays (FPGAs), Application-Specific Integrated Circuits (ASICs), Application-Specific Standard Products (ASSPs), System-on-a-chip systems (SOCs), Complex Programmable Logic Devices (CPLDs)), etc. as permitted by the context described above and throughout the document.

Although the disclosure uses language that is specific to structural features and/or methodological acts, the disclosure is not limited to the specific features or acts described. Rather, the specific features and acts are disclosed as illustrative forms of implementing the disclosure.

What is claimed is:

1. A method of focus calibration in a portable electronic device, the method comprising:
    receiving an input to activate a camera function of the portable electronic device;
    moving, by a drive mechanism, a lens assembly of the portable electronic device towards an end of a lens assembly travel;
    detecting an audio signal associated with the lens assembly reaching the end and recording an end value; and
    generating a lens assembly travel profile based at least in part on the end value, the lens assembly travel profile indicative of a lens assembly position for focusing.

2. A method of claim 1, further comprising:
    activating, upon receiving the input to activate the camera function, one or more microphones of the portable electronic device to detect the audio signal.

3. A method of claim 1, wherein the end value corresponds to an input value to the drive mechanism when one or more microphones detect the audio signal.

4. A method of claim 3, wherein the value is a digital-to-analog converter (DAC) value supplied to the drive mechanism when the one or more microphones detect the audio signal.

5. A method of claim 1, wherein the end of the lens assembly travel comprises a first end of lens assembly travel, the audio signal associated with the lens assembly reaching the first end of lens assembly travel comprises a first audio signal, and the end value recorded when the lens assembly reaching the first end of lens assembly travel comprises a first end value, the method further comprising:
    moving, by the drive mechanism, the lens assembly towards a second end of the lens assembly travel;
    detecting a second end audio signal associated with the lens assembly reaching a second end and recording a second value; and
    wherein the generating the lens assembly travel profile is further based at least in part on the second end value.

6. A method of claim 1,
    wherein the detecting the audio signal comprises:
        processing the audio signal to obtain a processed audio signal;
        comparing the processed audio signal to a standard audio signal profile stored in the portable electronic device; and
        validating the value if the audio signal matches the standard audio signal profile within a threshold tolerance.

7. A method of claim 1, wherein the generating the lens assembly travel profile comprises:
    selecting a candidate profile from a plurality of lens assembly travel profiles stored in the portable electronic device based upon at least one of:
        ambient temperature, or
        orientation of the portable electronic device; and
    revising the candidate profile based upon the value.

8. A method of claim 7, wherein the plurality of lens assembly travel profiles comprises:
    a set of ambient temperature lens assembly travel profiles based on a fixed orientation at a plurality of ambient temperature points, and
    a set of orientation lens assembly travel profiles based on a fixed ambient temperature at a plurality of orientations.

9. A camera focus device comprising:
    a housing;
    one or more processors;
    a lens assembly disposed in the housing, the lens assembly configured to move along a travel relative to the housing, the travel having a first end and second end opposite the first end;
    a drive mechanism communicatively coupled to the lens assembly and to the one or more processors, the drive mechanism configured to move the lens assembly along the travel based on a drive input signal;
    one or more microphones communicatively coupled to the one or more processors, the one or more microphones configured to detect an audio signal produced by the lens assembly reaching an end of the travel; and
    an audio profile store communicatively coupled to the one or more processors, the audio profile store configured to:
        record a value corresponding to the drive input signal when the one or more microphones detects the audio signal, and
        generate, based at least in part on the value, a lens assembly travel profile indicative of a lens assembly position for focusing.

10. A camera focus device of claim 9, further comprising a comparator communicatively coupled to the one or more processors and to the audio profile store, the comparator configured to:
    compare the audio signal to a standard audio signal profile stored in the audio profile store, and
    validate the value if the audio signal is within a threshold tolerance of the standard audio signal profile.

11. A camera focus device of claim 10, further comprising an audio processor communicatively coupled to the one or more processors, to the audio profile store, and to the comparator, the audio processor configured to:
    process the audio signal by at least one of:
        filtering to reduce noise on the audio signal, or
        applying Fast Fourier Transform to extract frequency components of the audio signal.

12. A camera focus device of claim 9, further comprising:
    a digital-to-analog converter (DAC) communicatively coupled to the one or more processors and to the drive mechanism, the DAC configured to receive the value from the one or more processors and to provide a corresponding voltage as the drive input signal to the drive mechanism.

13. A camera focus device of claim 9, further comprising:
    one or more environment sensors coupled to the one or more processors, the one or more environment sensors configured to detect at least one of:
        ambient temperature, or
        orientation of the camera focus device.

14. A camera focus device of claim 13, wherein the audio profile store is further configured to:
- store a plurality of lens assembly travel profiles comprising:
  - a set of ambient temperature lens assembly travel profiles based on a fixed orientation at a plurality of ambient temperature points, and
  - a set of orientation lens assembly travel profiles based on a fixed ambient temperature at a plurality of orientations;
- select a candidate profile from the plurality of lens assembly travel profiles based on at least one of ambient temperature or orientation of the camera focus device, and
- revise the candidate profile based upon a first value and a second value of the drive input signal respectively corresponding to a first end and a second end of the travel.

15. A camera focus device of claim 9, wherein the drive mechanism comprises a voice coil motor positioned concentrically relative to the lens assembly.

16. A camera focus device of claim 9, further comprising:
- a suspension mechanism attached to the lens assembly and housing, the suspension mechanism configured to suspend the lens assembly in a neutral position relative to the housing when the drive mechanism is inactive, and to provide a resistance against a movement of the lens assembly.

17. A system comprising:
- one or more processors;
- a focus assembly communicatively coupled to the one or more processors;
- one or more microphones communicatively coupled to the one or more processors; and
- memory communicatively coupled to the one or more processors, the memory storing instructions that, when executed by the one or more processors, cause the system to:
  - receive an input to activate a camera function of the system;
  - move a lens assembly towards an end of the lens assembly travel;
  - detect, by the one or more microphones, an audio signal associated with the lens assembly reaching the end of the lens assembly travel and recording a value; and
  - generate a lens assembly travel profile based at least in part on the value, the lens assembly travel profile indicative of the lens assembly position for focusing.

18. A system of claim 17, wherein the instructions, when executed by the one or more processors, further cause the system to:
- process the audio signal;
- compare the audio signal to a standard audio signal profile stored in the memory; and
- validate the value if the processed audio signal matches the standard audio signal profile within a threshold tolerance.

19. A system of claim 17, wherein the instructions, when executed by the one or more processors, further cause the system to:
- select a candidate profile from a plurality of lens assembly travel profiles stored in the system based upon at least one of:
  - ambient temperature, or
  - orientation of the focus assembly; and
- revise the candidate profile based upon the value.

20. A system of claim 19, wherein the instructions, when executed by the one or more processors, further cause the system to:
- save the revised candidate profile as a new lens assembly travel profile.

* * * * *